US011839852B2

(12) United States Patent
Snow et al.

(10) Patent No.: US 11,839,852 B2
(45) Date of Patent: Dec. 12, 2023

(54) SYSTEMS FOR SEPARATING ISOTOPES FROM A SAMPLE OF FISSION PRODUCTS

(71) Applicant: Battelle Energy Alliance, LLC, Idaho Falls, ID (US)

(72) Inventors: Mathew S. Snow, Idaho Falls, ID (US); Jessica L. Ward, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 267 days.

(21) Appl. No.: 17/154,658

(22) Filed: Jan. 21, 2021

(65) Prior Publication Data

US 2021/0283551 A1    Sep. 16, 2021

Related U.S. Application Data

(62) Division of application No. 16/152,893, filed on Oct. 5, 2018, now Pat. No. 10,905,999.

(51) Int. Cl.
*B01D 59/30* (2006.01)
*B01D 15/24* (2006.01)
*B01D 15/22* (2006.01)
*C22B 60/02* (2006.01)

(52) U.S. Cl.
CPC ............ *B01D 59/30* (2013.01); *B01D 15/22* (2013.01); *B01D 15/24* (2013.01); *C22B 60/0265* (2013.01)

(58) Field of Classification Search
CPC ...... B01D 15/22; B01D 15/24; B01D 15/242; B01D 15/245; B01D 15/247; B01D 15/361; B01D 15/362; B01D 15/364; B01D 15/1864; B01D 15/1871; B01D 15/1878; B01D 15/1885; B01D 15/20; B01D 59/26
See application file for complete search history.

(56) References Cited

U.S. PATENT DOCUMENTS

| | | | |
|---|---|---|---|
| 3,869,536 A | 3/1975 | James | |
| 4,112,044 A | 9/1978 | Miyake et al. | |
| 4,123,498 A | 10/1978 | Rosenbaum et al. | |
| 4,537,759 A * | 8/1985 | Walker | B01D 53/025 95/82 |
| 4,548,790 A | 10/1985 | Horwitz et al. | |
| 4,748,008 A | 5/1988 | Takeda et al. | |
| 5,130,001 A | 7/1992 | Snyder et al. | |
| 7,976,708 B2 | 7/2011 | Chintalachervu et al. | |
| 10,020,085 B2 | 7/2018 | Denton | |
| 2009/0162278 A1 * | 6/2009 | Ravn | G21G 1/10 424/1.49 |
| 2011/0232373 A1 | 9/2011 | Desmet et al. | |
| 2011/0273708 A1 * | 11/2011 | Tong | G01N 21/3504 356/311 |
| 2011/0277592 A1 * | 11/2011 | Cutler | C22B 3/42 75/393 |
| 2013/0068671 A1 * | 3/2013 | Gebauer | B01D 15/1864 210/85 |
| 2015/0204859 A1 | 7/2015 | Craighead et al. | |
| 2016/0024617 A1 | 1/2016 | Auxier et al. | |

FOREIGN PATENT DOCUMENTS

WO    WO-2007043874 A1 *    4/2007    ............. B01D 15/14

OTHER PUBLICATIONS

International Search Report from International Application No. PCT/US19/054678, dated Mar. 26, 2020, 2 pages.
International Written Opinion from International Application No. PCT/US19/054678, dated Mar. 26, 2020, 8 pages.
Mathew Spencer Snow, Detection of the Actinides and Cesium From Environmental Samples, A dissertation submitted in partial fulfillment of the requirements for the degree of Doctor of Philosophy, Washington State University, Department of Chemistry, Aug. 2014, 259 pages.
Nagy et al., Automated Separation Process for Radioanalytical Purposes at Nuclear Power Plants, Journal of Chromatography A, vol. 46, Oct. 2, 1987, pp. 359-366 (abstract only).
O'Hara et al., Automated Radioanalytical Chemistry: Applications for the Laboratory and Industrial Process Monitoring, 2nd Japan-IAEA Workshop on Advanced Safeguards Technology for the Future Nuclear Fuel Cycle, Nov. 10-13, 2009. Tokai-mura, Ibaraki, Japan, pp. 1-11.
Snow et al., Extraction Chromatographic Separations of Tantalum and Tungsten from Hafnium and Complex Matrix Constituents, Journal of Chromatography A, Idaho National Laboratory, Jan. 2017, 26 pages.

* cited by examiner

*Primary Examiner* — Ryan B Huang
(74) *Attorney, Agent, or Firm* — TraskBritt

(57) ABSTRACT

Systems and methods for efficient, effective, and safe separation and isolation of multiple isotopes (e.g., Mo, Zr, Ba, Sr, Te, and lanthanide isotopes) from fission products includes use of a plurality of chromatography columns, each containing a chromatographic resin formulated to target one or more particular isotopes. The system is operable in a "series" configuration to load the multiple columns by a single pass of the sample. Then, the system may be transitioned (e.g., using valves) to a "parallel" configuration in which multiple columns of the system may be operated simultaneously to elute targeted isotopes. Additional parallel operations of the columns, using different eluent compositions, may be used to elute different targeted isotopes. The system may be reconditioned in preparation for a subsequent sample.

15 Claims, 8 Drawing Sheets

SYSTEMS FOR SEPARATING ISOTOPES FROM A SAMPLE OF FISSION PRODUCTS

CROSS-REFERENCE TO RELATED APPLICATION

This application is a divisional of U.S. patent application Ser. No. 16/152,893, filed Oct. 5, 2018, now U.S. Pat. No. 10,905,999, issued Feb. 2, 2021, the disclosure of which is hereby incorporated in its entirety herein by this reference.

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

FIELD

The disclosure, in various embodiments, relates generally to the separation of isotopes from fission products. More particularly, the disclosure relates to systems and methods for separating more than one isotope from fission products, such as uranium fission products, in a fast procedure without necessitating transportation of samples or dry down steps.

BACKGROUND

When a material such as uranium undergoes fission, the resulting fission products include a number of isotopes (e.g., radioactive isotopes). Separating and isolating some or all of these isotopes are routinely performed for nuclear fuel analyses and for isotope production. For example, isolated isotopes may be useful in later homeland security training applications.

Conventional methodologies for isolating isotopes from fission products often include multiple, single stage gravimetric separations steps. Each separation step may use a column and procedure configured to target and enable isolation of particular one or more isotopes. Often, the individual separation steps are not compatible for isolating or separating other isotopes from the fission products. Therefore, to separate and isolate an additional isotope or group of isotopes, additional separation steps may be needed, and the materials, equipment, or conditions most appropriate for the additional separations may be different from the materials, equipment, or conditions used for the preceding separations. For example, some isotopes targeted for separation and isolation may be best targeted by using, in a column, a matrix of a certain composition, while other isotopes targeted for separation and isolation may be best targeted by using, in the column or a different column, another matrix of a different composition. Therefore, between separation steps using different matrix compositions, interrupting "dry down" steps may be needed to reconfigure the equipment and materials to target the new isotope or group. During the dry down step, the matrix composition may be allowed to evaporate, such as by transporting the equipment containing the matrix composition to a hotplate. The evaporation may take significant time (e.g., eight hours or more). The interruption of these dry down steps may significantly increase the time, manpower, and cost of completing a separation, isolation, and/or analysis of fission products. And, the transportation of materials to the hotplate for the dry down steps may introduce an opportunity for accidents, sample losses, and potentially radioactive contamination of the workspace. Accordingly, separating and isolating isotopes from fission products in an efficient, effective, and safe manner continues to present challenges.

BRIEF SUMMARY

Disclosed is a system for separating isotopes from a sample of fission products. The system comprises a plurality of chromatography columns. Each contains a chromatographic resin differing in isotope selectivity from other chromatographic resins of the system. A plurality of valves are in operative connection to lines communicating between at least some of the chromatography columns. The valves are adjustable to transition the system between a series configuration, wherein a fluid passage is defined through at least some of the chromatography columns in series, and a parallel configuration, wherein a plurality of fluid passages is defined through the chromatography columns in parallel.

Also disclosed is a method for separating isotopes from a sample of fission products. The method comprises passing the sample of fission products through a series of chromatography columns, each comprising a different chromatographic resin. The method also includes disconnecting the chromatography columns from the series, and eluting isotopes from the chromatography columns. The eluting comprises concurrently eluting at least one isotope from at least one of the chromatography columns while eluting at least one other isotope from at least one other of the chromatography columns.

In addition, disclosed is a method for operating a system of chromatography columns. The method comprises connecting at least some of the chromatography columns in a series, with each of the chromatography columns containing a different chromatographic resin. A fluid sample, comprising fission products, is passed through the series of the chromatography columns. Valves of the system are adjusted to place the chromatography columns in a parallel configuration. Elution solutions are passed through the chromatography columns in the parallel configuration. The elution solution passed through at least one of the chromatography columns has a different composition or concentration than another elution solution passed through another of the chromatography columns.

BRIEF DESCRIPTION OF THE DRAWINGS

FIGS. 1 through 7 illustrate various stages in a method for isolating multiple isotopes from fission products using the system, according to an embodiment of the disclosure.

DETAILED DESCRIPTION

Figure 1:
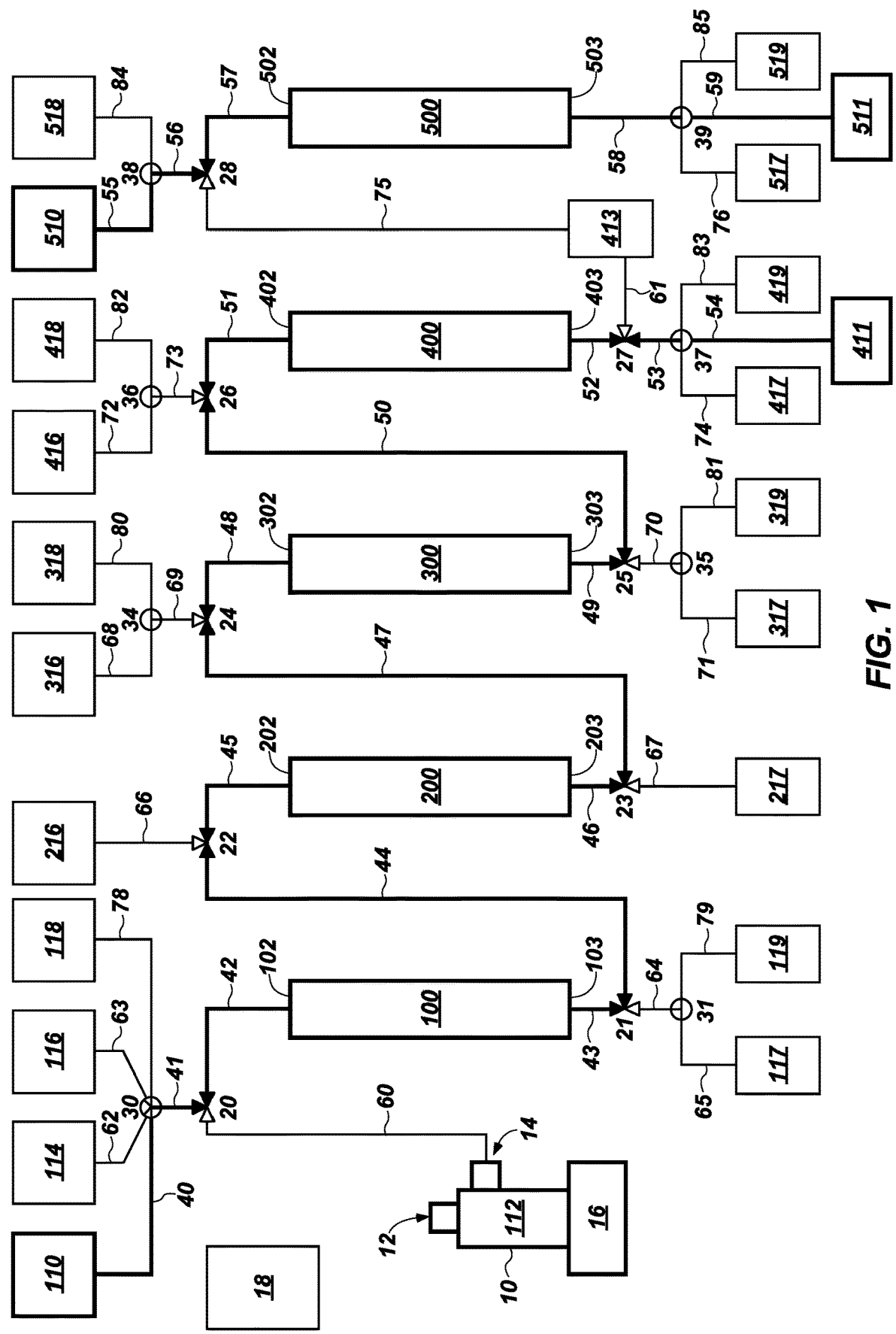
FIGS. 1 through 7 are schematic illustrations of a system for isolating multiple isotopes from fission products.
Figure 2:
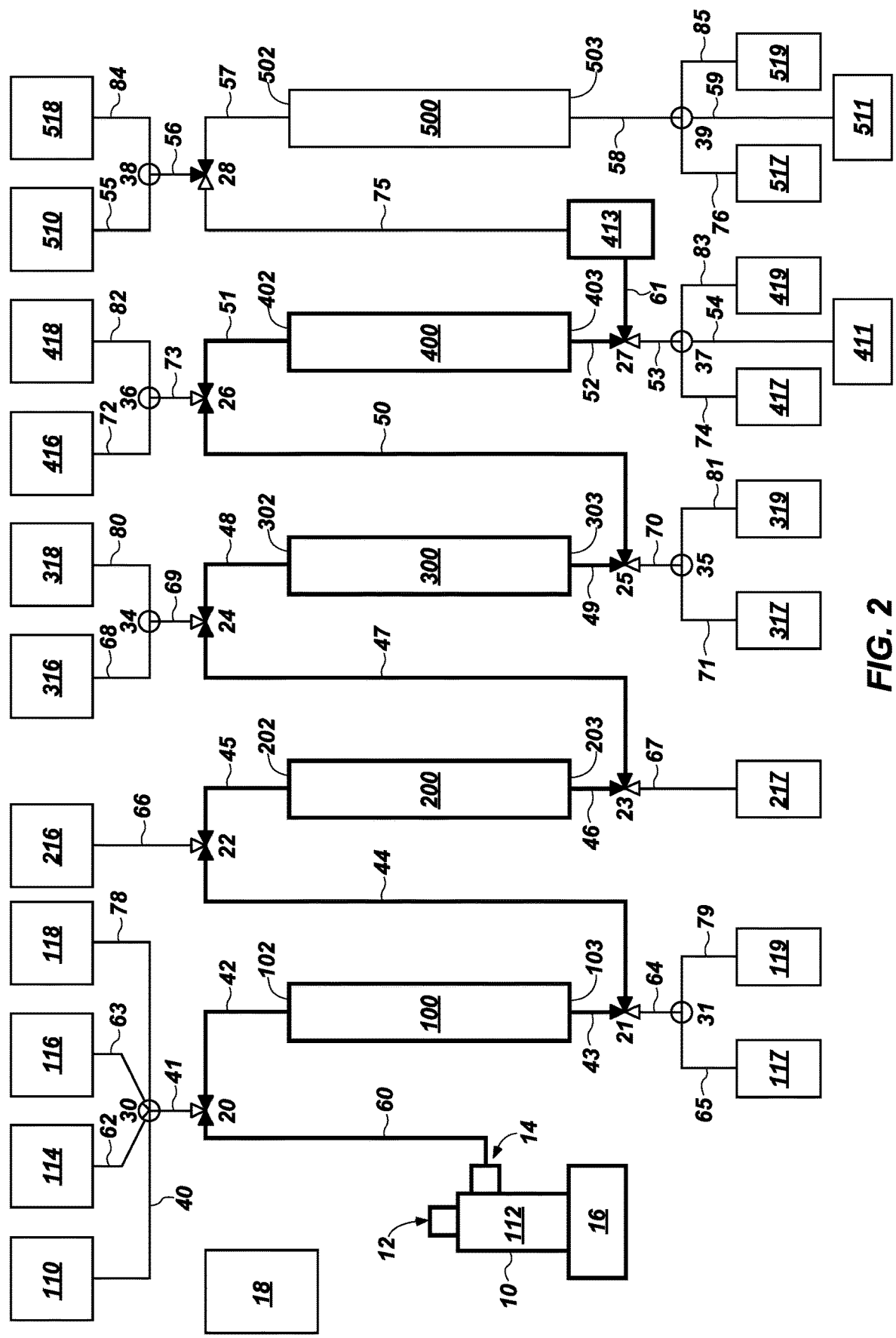

The systems and methods, according to embodiments of the disclosure, enable efficient, effective, and safe separation and isolation of multiple isotopes (e.g., Mo, Zr, Ba, Sr, Te, and lanthanide isotopes) from fission products (e.g., from the products of uranium fission, zirconium clad fission, plutonium fission, thorium fission, or other material fission). The system includes a plurality of chromatography columns, each containing a chromatographic resin formulated to target one or more particular isotopes from a sample containing fission products. The system can be operated in a "series"

configuration to load the multiple columns by a single pass of the sample. Then, the system may be transitioned (e.g., using valves) to a "parallel" configuration in which multiple columns of the system may be operated simultaneously to elute targeted isotopes. Additional parallel operations of the columns, using different eluent compositions, may be used to elute different targeted isotopes. The system may be reconditioned in preparation for a subsequent sample. A single sample may be processed through the system in a manner of hours (e.g., less than three hours), as opposed to a processing time of days (e.g., a week) as may be common with conventional separation methods and systems. Further, the system may be configured as an entirely closed system or as a substantially-closed system, such as with only a single opening for pressure relief on an initial dissolution container. The closed or substantially-closed nature of the system may reduce or eliminate the potential for material losses during use of the system. Also, the sample may be processed without transporting the sample or loaded materials away from the system during the processing. Both the closed, or substantially-closed, nature of the system and the lack of requirement for physical manipulation or transportation of items from the system may help eliminate or reduce the accident, sample loss, and contamination risks that may be common with conventional separation methods and systems.

As used herein, the terms "about" and "approximately," when either is used in reference to a numerical value for a particular parameter, are inclusive of the numerical value and a degree of variance from the numerical value that one of ordinary skill in the art would understand is within acceptable tolerances for the particular parameter. For example, "about" or "approximately," in reference to a numerical value, may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

As used herein, the terms "comprises," "comprising," "includes," and/or "including" specify the presence of stated materials, elements, and/or isotopes, but do not preclude the presence or addition of one or more other materials, elements, and/or isotopes thereof.

As used herein, "and/or" includes any and all combinations of one or more of the associated listed items.

As used herein, the singular forms "a," "an," and "the" are intended to include the plural forms as well, unless the context clearly indicates otherwise.

The following description provides specific details, such as material types and processing conditions, in order to provide a thorough description of embodiments of the disclosed materials and methods. However, a person of ordinary skill in the art will understand that the embodiments of the materials and methods may be practiced without employing these specific details. Indeed, the embodiments of the materials and methods may be practiced in conjunction with conventional techniques employed in the industry.

The processes described herein do not form a complete process flow for the related methods. The remainder of the methods are known to those of ordinary skill in the art. Accordingly, only the methods and conditions necessary to understand embodiments of the present materials and methods are described herein.

The illustrations presented herein are not meant to be actual views of any particular system component, but are merely idealized representations that are employed to describe embodiments of the disclosure.

The following description provides specific details, such as concentrations, volumes, and/or other processing conditions, in order to provide a thorough description of the disclosed systems and methods. However, a person of ordinary skill in the art will understand that the embodiments of the systems and methods may be practiced without employing these specific details. Indeed, the embodiments of the systems and methods may be practiced in conjunction with conventional techniques employed in the industry.

Reference will now be made to the drawings, wherein like numerals refer to like components throughout. The drawings are not necessarily drawn to scale.

With reference to FIGS. 1 through 7, schematically illustrated is a system for isolating multiple isotopes from fission products. These figures also schematically illustrate a method for operating the system to isolate the multiple isotopes. Within the progression of figures, bold lines or grey shading indicate the system components in active use in the illustrated stage of the method.

The system includes a plurality of chromatography columns, e.g., a first column 100, a second column 200, a third column 300, a fourth column 400, and a fifth column 500. In other embodiments, the system may include a greater or lesser number of columns. Each of the columns 100, 200, 300, 400, and 500 may contain a select extraction chromatographic or ion exchange resin, formulated—according to embodiments of the disclosure—to target one or more particular isotopes expected to be in the sample to be processed and with consideration to the eluent to be used in the system. For example, the composition and configuration of the resins as well as the compositions of concentrations of solutions to be used with the resins (e.g., preconditioning solutions) may be selected and tailored, according to embodiments of the disclosure, to configure the resins to be specific for particular one or more target isotopes. The columns 100, 200, 300, 400, and 500 may be arranged, relatively, to optimize the retention of isotopes from the fission products sample by the resins.

For example, in some embodiments, the first column 100 may contain a chromatography resin specific to zirconium (Zr) isotopes (e.g., Zr-95/97) and uranium (U) isotopes, such as UTEVA® Resin, available from Eichrom Technologies, Inc. The second column 200 may contain a chromatography resin specific to isotopes in the lanthanide series (e.g., Nd-146), such as TRU Resin, available from Eichrom Technologies, Inc. The third column 300 may contain a chromatography resin specific to molybdenum (Mo) isotopes (e.g., Mo-99), such as DIPHONIX® Resin, available from Eichrom Technologies, Inc. The fourth column 400 may contain a chromatography resin specific to barium (Ba) isotopes (e.g., Ba-140) and strontium (Sr) isotopes (e.g., Sr-89/90/91), such as SR Resin, available from Eichrom Technologies, Inc. The fifth column 500 may contain a chromatography resin specific to tellurium (Te) isotopes (e.g., Te-131/132), such as TEVA® Resin, available from Eichrom Technologies, Inc. While the aforementioned resins may be presently commercially available, the resins, as conventionally used and configured, may not be specific for the aforementioned isotopes in the same manner enabled by the embodiments of this disclosure. For example, TEVA®

Resin, as commercially available, may be conventionally used for the analysis of technetium (Tc); but, when this resin is used with the preconditioning solutions and eluent solutions of embodiments of this disclosure, the TEVA® Resin may be configured, according to present embodiments, to be specific to tellurium (Te) isotopes.

The system includes a container 10 (e.g., a vial) with more than one accessible opening (e.g., vents, ports) 12, 14. After irradiating a material (e.g., uranium (U), zirconium, plutonium, thorium, or combinations thereof), the irradiated material may be added to the container 10. A solvent (e.g., concentrated nitric acid ($HNO_3$)) may also be added to the container 10 to dissolve the irradiated material to provide the fissions products sample 112 (e.g., an acid-based solution containing fission products from which isotopes are to be separated). The container 10 containing the sample 112 may be placed on a heat source (e.g., hotplate 16) to encourage the dissolution of the irradiated material. Additional solvent may be added to bring the total concentration and volume of the sample 112 to a desired level. The resulting sample 112 may then be processed in the system to separate the target isotopes therefrom, as discussed below.

Prior to running the sample 112 through the system, the columns 100, 200, 300, 400, and 500 may be preconditioned by passing an appropriate preconditioning solution therethrough. The preconditioning solution that is appropriate for each column 100, 200, 300, 400, and 500 may depend upon the resin contained therein. For example, columns 100, 200, 300, and 400, if containing UTEVA, TRU, DIPHONIX, and SR Resins, respectively, may be preconditioned with a preconditioning solution 110 that comprises, consists essentially of, or consists of an acid, e.g., nitric acid ($HNO_3$), while the fifth column 500, containing the TEVA Resin, may be preconditioned using another preconditioning solution 510 that comprises, consists essentially of, or consists of another acid, e.g., hydrochloric acid (HCl).

To precondition the columns 100, 200, 300, 400, and 500 in this manner, lines and valves of the system may be configured (e.g., by a system user) to put columns 100, 200, 300, and 400 in a "series" configuration with column 500 in a separate configuration. That is, the system may be configured to enable passage of the preconditioning solution 110 through the first column 100, then through the second column 200, then through the third column 300, then through the fourth column 400. For example, valves 20, 21, 22, 23, 24, 25, and 26 may be positioned, by the system user, to allow passage through a series of tubes that connect the first, second, third, and fourth columns 100, 200, 300, and 400 in series. Thus, the preconditioning solution 110 may pass (e.g., through line 40, junction 30, and line 41) through valve 20, through line 42, into the top 102 of the first column 100, through the first column 100, out the bottom 103 of the first column 100, through line 43, through valve 21, through line 44, through valve 22, through line 45, into a top 202 of the second column 200, through the second column 200, out of a bottom 203 of the second column 200, through line 46, through valve 23, through line 47, through valve 24, through line 48, into a top 302 of the third column 300, through the third column 300, out of a bottom 303 of the third column 300, through line 49, through valve 25, through line 50, through valve 26, through line 51, into a top 402 of the fourth column 400, through the fourth column 400, out of a bottom 403 of the fourth column 400, into a receptacle 411 (e.g., by way of line 52, valve 27, line 53, junction 37, and line 54).

During, before, or after the preconditioning of the first through fourth columns 100, 200, 300, and 400, the fifth column 500 may be preconditioned with the other preconditioning solution 510. The fifth column 500 may be operated without line communication with the other columns 100, 200, 300, 400. That is, the fifth column 500 may be preconditioned in parallel with the other columns 100, 200, 300, 400. For example, the other preconditioning solution 510 may be passed (e.g., through line 55, junction 38, line 56, valve 28, and line 57) into a top 502 of the fifth column 500, through the fifth column 500, out a bottom 503 of the fifth column 500, and into a receptacle 511 (e.g., by way of line 58, junction 39, and line 59).

Thus, one or more of the columns of the system may be preconditioned in a series configuration while one or more other columns of the system are preconditioned in a parallel configuration. The system therefore enables preconditioning of multiple columns concurrently with one another, even when using different preconditioning solutions for one or more of the columns. One of ordinary skill in the art will appreciate that, with appropriate adjustment of the valves 20-28 (and/or the junctions 30, 31, 34, 35, 36, 37, 38, 39), any number of adjacent columns of the system may be operated in series while other next adjacent columns of the system are operated in parallel or in separate series.

As used herein, the term "line" means and refers to a conduit through which a fluid is passable. For example, a "line" may include tubing (e.g., plastic tubing).

As used herein, the term "junction" means and refers to an intersection of various lines. The junction may be occupied by an adjustable valve that is configured to allow a system operator to selectively communicate an input line with an output line. In such embodiments, adjustment of the valve may enable switching the system from one fluid source to another or from one fluid receptacle to another. In other embodiments, the "junction" may be in the form of a single line that is physically movable, e.g., by a system operator, to change the source and/or drain of the line. For example, in some embodiments, junction 30 may represent a single line that may be moved, by the operator, to be fed by sources (e.g., compositions 110, 114, 116, 118) respectively, such that, in one stage of the method, the line may be referenced by numbers 40, 30, and 41 in combination, while in another stage of the method, the line may be referenced by numbers 62, 30, and 41 in combination. So, lines joining at junctions 30, 31, 34, 35, 36, 37, 38, and 39 are not necessarily separate lines, though, in some embodiments they may be.

During this preconditioning stage or during any other stage of the methods described, passage of compositions through lines, valves, and columns may be accomplished in part by gravity and in part by use of a pump 18 (e.g., a peristaltic pump) that may be operational contact with any or all of the lines described herein.

To complete the preconditioning, the system may be run until all of the preconditioning solutions 110, 510 have flowed through (e.g., been pumped through) their respective one or more of the columns 100, 200, 300, 400, and 500 until the columns 100, 200, 300, 400, and 500 are dry.

Once the columns 100, 200, 300, 400, and 500 have been preconditioned the fission products sample 112 may be run through a number of the columns 100, 200, 300, 400, and 500 in series. For example, with reference to FIG. 2, the top 102 of the first column 100 may be connected (e.g., by line 42, through valve 20, line 60, and into opening 14) to the container 10 in which the fission products sample 112 was prepared through dissolution. In some embodiments, a single line may connect from the container 10 to the first column 100, such as by moving a line that was previously connected to a source (e.g., vial) for the preconditioning solution 110. In other embodiments, the first column 100 may be connected to the container 10 by operator manipulation of valves (e.g., valve 20 and junction 30) to connect the appropriate conduit path. Meanwhile, additional columns of the system, e.g., second, third, and fourth columns 200, 300, and 400, may remain in connection with the first column 100 by the series configuration of the system previously set at valves 21, 22, 23, 24, 25, and 26.

With columns 100, 200, 300, and 400 in series connection, the fission products sample 112 may be passed through each in sequence (e.g., from the container 10, out of the opening 14, through line 60, through valve 20, through line 42, through the first column 100, through line 43, through valve 21, through line 44, through valve 22, through line 45, through the second column 200, through line 46, through valve 23, through line 47, through valve 24, through line 48, through the third column 300, through line 49, through valve 25, through line 50, through valve 26, through line 51, and through the fourth column 400).

After exiting the bottom 403 of the fourth column 400, the sample 112 may be collected in receptacle 413 (e.g., through line 52, valve 27, and line 61). In some embodiments, the receptacle 413 may contain an amount of the other preconditioning solution (e.g., hydrochloric acid (HCl)) with which will mix with the fluid exiting the fourth column 400 as it is collected in the receptacle 413.

As the sample 112 passed through the resins within the columns 100, 200, 300, and 400, the different resins absorbed isotopes from the fission products in the sample 112, with some resins targeting one or more particular isotopes and other resins targeting others. Thus, in designing the system and ordering the resins by the relative arrangement of the columns 100, 200, 300, 400, and 500, the isotope selectivity of the resins may be pertinent. For example, a resin A that is selective for isotopes X, Y, and Z may be arranged subsequent to a resin B that is selective to only isotope X, to ensure that isotope X is retained within the column containing resin B as the sample first passes through it before moving on to the column containing resin A, wherein remaining isotopes Y and Z may be retained. Likewise, arranging a column with a resin C selective to isotopes X and Y after the column with resin A and before the column with resin B should enable the column with resin B to first retain isotope X, then the column with resin C to retain essentially only isotope Y (because isotope X was already retained within the first column), leaving the final column with resin A to retain only isotope Z, and the remainder of the sample to pass through the system.

The selectivity of the resins for particular isotopes depends, also, upon the other chemicals passed through the columns. For example, the chemical composition and concentration of the solvent used for the sample dissolution and for preconditioning the column may impact the selectivity of the resins. To illustrate, one resin may exhibit higher selectivity for isotope X when the resin has been preconditioned with acid N than if the resin had been preconditioned with acid M. Likewise, the resin may exhibit higher selectivity for isotope X when the acid N is at a higher concentration compared to at a lower concentration. These impacts on selectivity due to variation in solvent (e.g., its composition and concentration) makes it surprising that the methods described herein enable effective separation of a number of isotopes from a single pass of a fission products sample through multiple columns, which may be run in series for the single pass.

Figure 3:
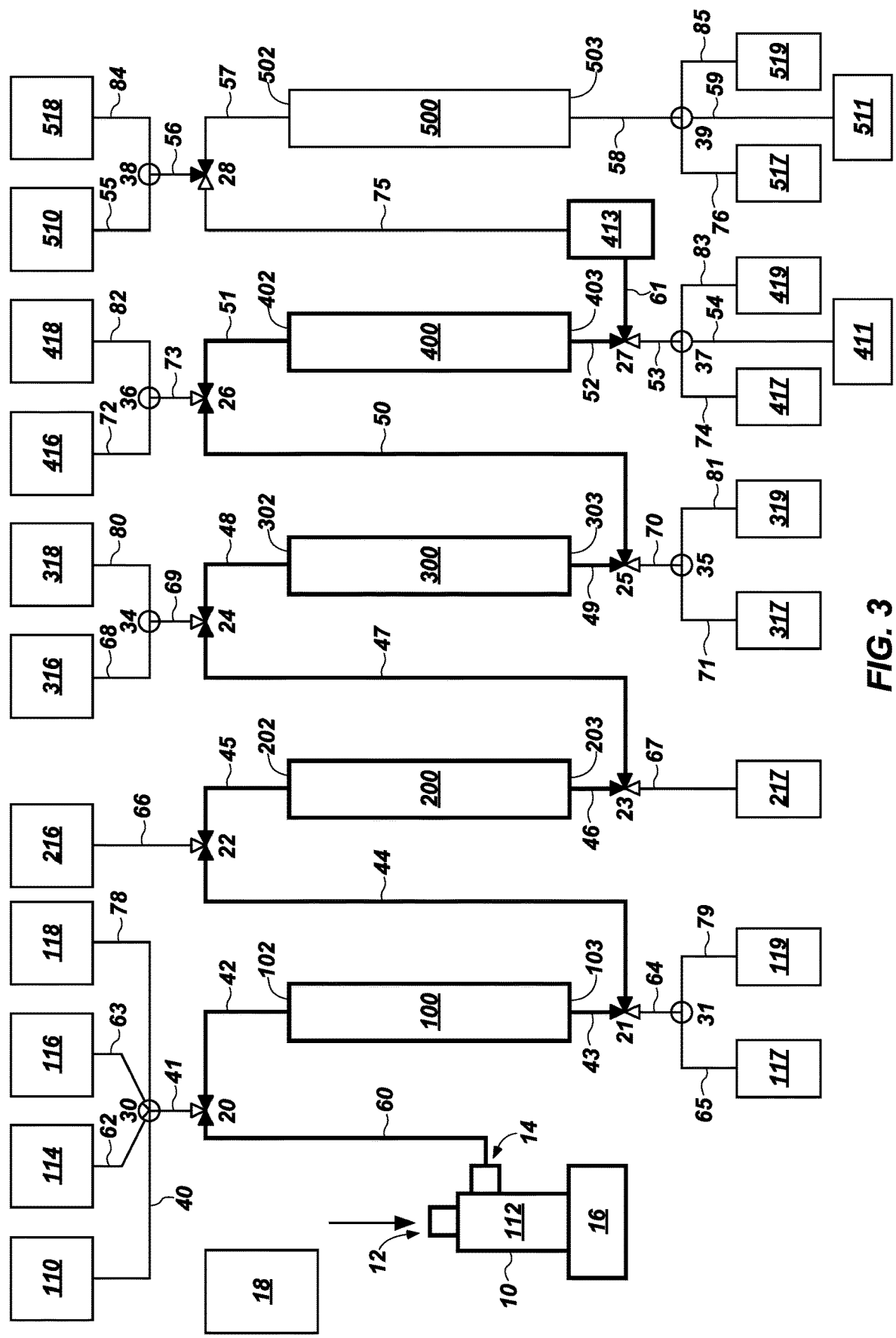

With reference to FIG. 3, once the sample 112 is completely passed through the select columns of the system in series, the pump 18 may be shut off and additional solvent (e.g., nitric acid ($HNO_3$)) added to the container 10 through the opening 12 (e.g., port in a lid of the container 10). The container 10 may then be agitated (e.g., by the system operator) to encourage mixing of the additional solvent in the container 10 to form a rinse solution, which may then be pumped through the same select columns of the system in series (i.e., through the first, second, third, and fourth columns 100, 200, 300, and 400) and collected in the receptacle 413. This passage of the rinse solution ensures all or substantially all of the fission products that had been in the container 10 have been passed into the appropriate columns of the system.

Figure 4:
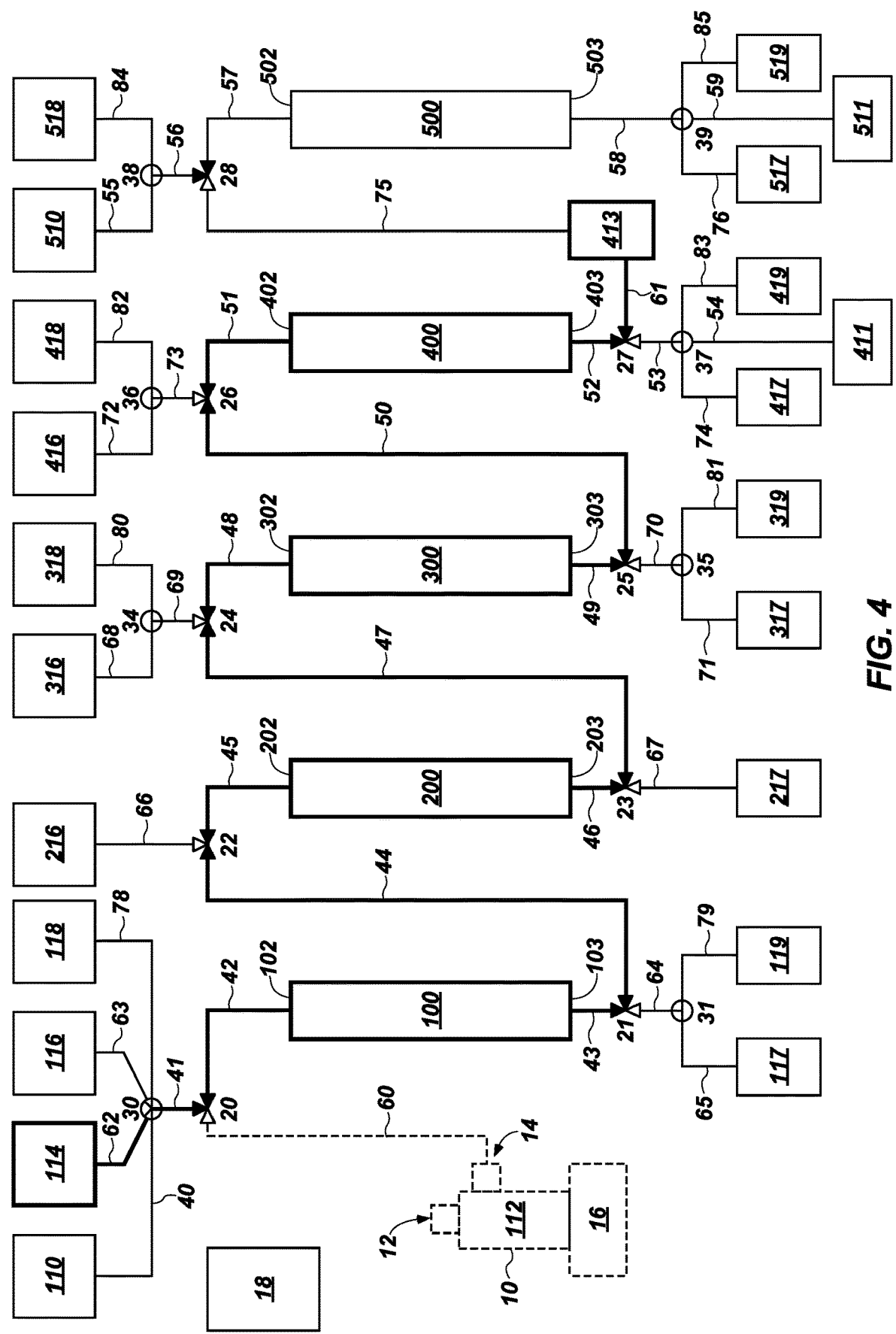

With reference to FIG. 4, the operator may then (optionally) disconnect the columns 100, 200, 300, and 400 of the system from the container 10 that previously contained the fission products sample 112 before running an additional amount of the solvent (e.g., nitric acid ($HNO_3$)) through the columns 100, 200, 300, 400 still in series. For example, the operator may dispose of the container 10 and the line leading from it, e.g., line 60. The operator may use valve 20 to connect the first column 100 to source 114 (e.g., via line 62, through junction 30, through line 41, through valve 20, and through line 42). In some embodiments, the original used valve 20 and line 42 may be discarded with the container 10 and replaced with a clean line for the subsequent steps of the method. For example, the connection between source 114 and the top 102 of the first column 100 may be a continuous line (e.g., tube). The hotplate 16 may also (optionally) be removed from the system. The resulting system configuration includes the source 114 being in series connection with each of the columns through which the sample 112 was passed, i.e., columns 100, 200, 300, and 400. And, the system may then be run to pump additional solvent (e.g., nitric acid ($HNO_3$)) from the source 114 through the first through fourth columns 100, 200, 300, and 400 in series, collecting the passed-through solvent in the receptacle 413.

Figure 5:
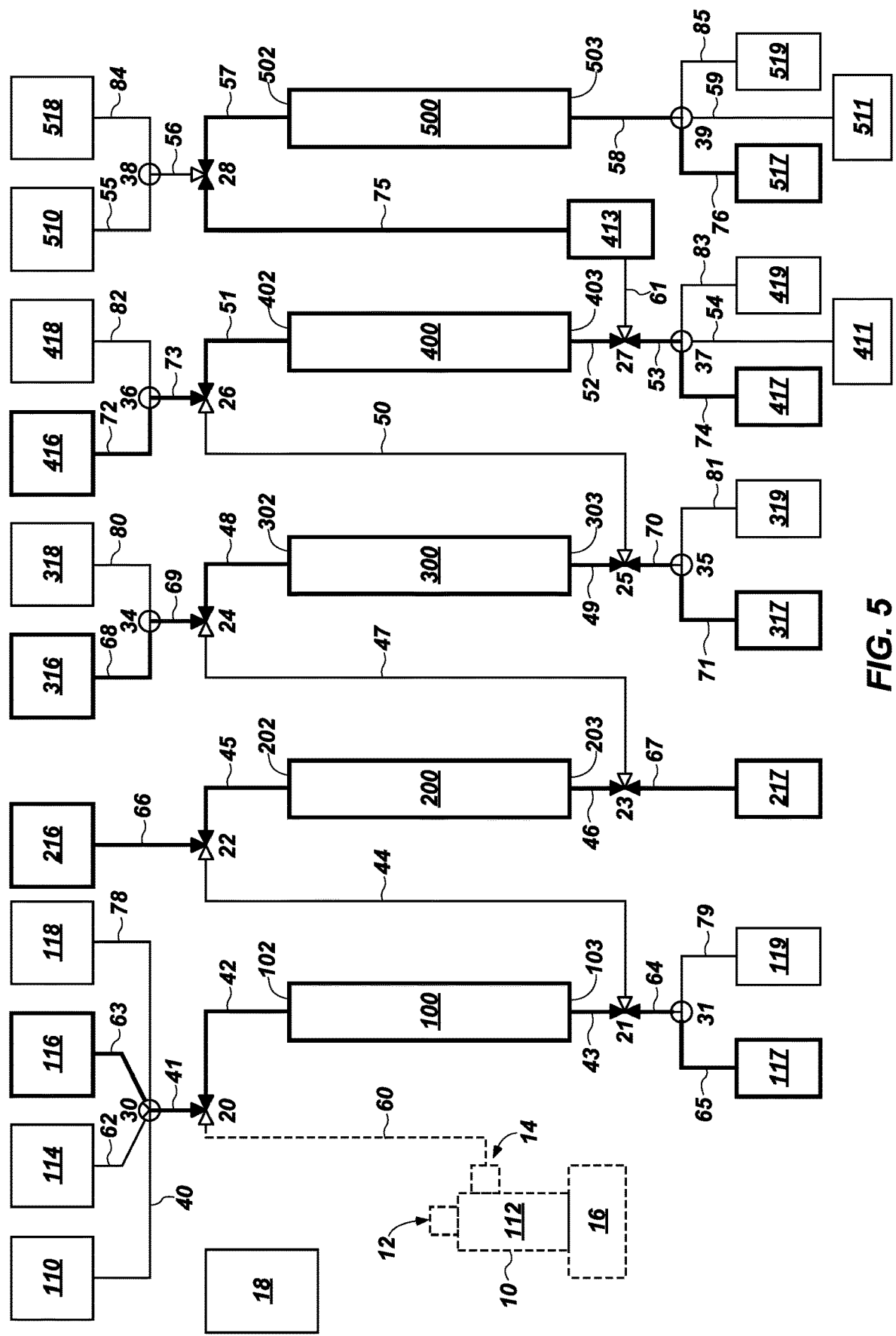

With reference to FIG. 5, the system operator may then change the position of valves 20, 21, 22, 23, 24, 25, 26, 27, and 28 as necessary to place the system in a "parallel" configuration with multiple (e.g., all) of the columns 100, 200, 300, 400, and 500 connected to individual sources (e.g., source containers (e.g., vials)) and receptacles (e.g., receptacle (e.g., vials)). For example, the first column 100 may be connected to source 116 (e.g., via line 63, junction 30, line 41, valve 20, and line 42) and receptacle 117 (e.g., via line 43, valve 21, line 64, junction 31, and line 65); the second column 200 may be connected to source 216 (e.g., via line 66, valve 22, and line 45) and receptacle 217 (e.g., via line 46, valve 23, and line 67); the third column 300 may be connected to source 316 (e.g., via line 68, junction 34, line 69, valve 24, and line 48) and receptacle 317 (e.g., via line 49, valve 25, line 70, junction 35, and line 71); the fourth column 400 may be connected to source 416 (e.g., via line 72, junction 36, line 73, valve 26, and line 51) and receptacle 417 (e.g., via line 52, valve 27, line 53, junction 37, and line 74); and the fifth column 500 may be connected to receptacle 413 as its source (e.g., via line 75, valve 28, and line 57) and receptacle 517 (e.g., via line 58, junction 39, and line 76).

The system may be operated to pump a separate elution solution through each of the columns 100, 200, 300, 400, and 500 with the elution solution formulated to elute a particular target isotope (or group of isotopes) from the resin within the respective one of the columns 100, 200, 300, 400, and 500. For example, zirconium (Zr) isotopes may be eluted from the UTEVA® Resin of the first column 100 by pumping an elution solution of nitric acid ($HNO_3$) (e.g., 3 M HNO$_3$) and hydrofluoric acid (HF) (e.g., 0.05 M HF) from source 116, with the eluate captured in receptacle 117. Lanthanides may be eluted from the TRU Resin of the second column 200 by pumping an elution solution of nitric acid (HNO$_3$) (e.g., 0.01 M HNO$_3$) from source 216, with the eluate captured in receptacle 217. Indium (In), antimony (Sb), and tin (Sn) isotopes may be eluted from the DIPHONIX® Resin of the third column 300 by pumping an elution solution of hydrochloric acid (HCl) (e.g., 3 M HCl) from source 316, with the eluate captured in receptacle 317. Barium (Ba) isotopes may be eluted from the SR Resin of the fourth column 400 by pumping an elution solution of nitric acid (HNO$_3$) (e.g., 8 M HNO$_3$) from source 416, with the eluate captured in receptacle 417. Additional fission products may be eluted from the TEVA® Resin of the fifth column 500 by pumping an elution solution of the contents of receptacle 413, followed by a rinse of hydrochloric acid (HCl) (e.g., 5M HCl), with the eluate captured in receptacle 517. Notably, these individual elutions through columns 100, 200, 300, 400, and 500 may be carried out concurrently, which may reduce the amount of time needed to process the sample 112 through the system.

Figure 6:
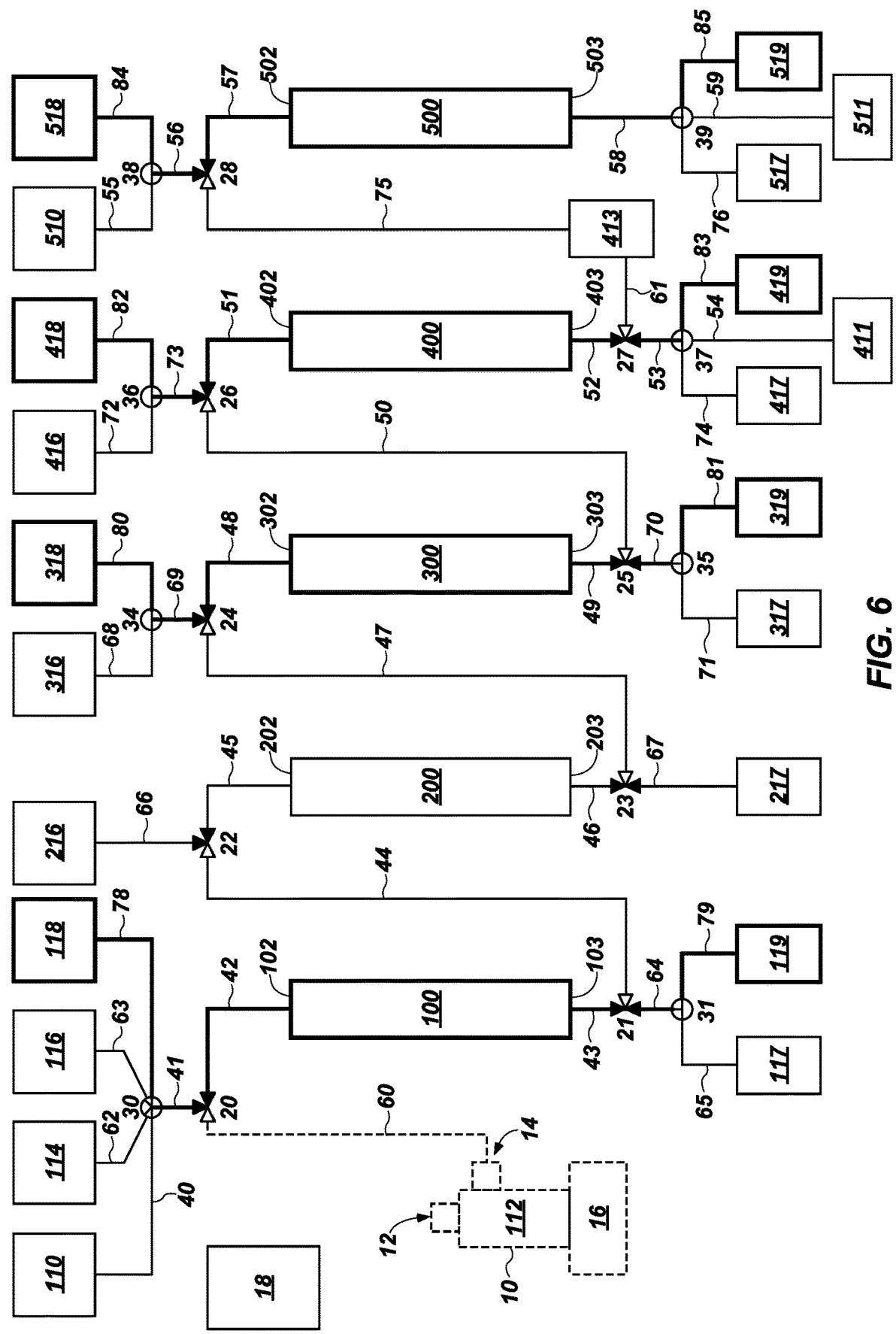

With reference to FIG. 6, additional target isotopes may be eluted from some or all of the columns, e.g., from the first, third, fourth, and fifth columns 100, 300, 400, and 500. To do so, the system operator may adjust junctions 30, 31, and 34 through 39, valve 28, and any of the other junctions and valves as necessary to place the system in a configuration with the appropriate columns 100 through 500 in communication with appropriate sources and receptacles. For example, the valves and junctions of the system may be adjusted so that the first column 100 may be connected to source 118 (e.g., via line 78, junction 30, line 41, valve 20, and line 42) and receptacle 119 (e.g., via line 43, valve 21, line 64, junction 31, and line 79); the third column 300 may be connected to source 318 (e.g., via line 80, junction 34, line 69, valve 24, and line 48) and receptacle 319 (e.g., via line 49, valve 25, line 70, junction 35, and line 81); the fourth column 400 may be connected to source 418 (e.g., via line 82, junction 36, line 73, valve 26, and line 51) and receptacle 419 (e.g., via line 52, valve 27, line 53, junction 37, and line 83); and the fifth column 500 may be connected to source 518 (e.g., via line 84, junction 38, line 56, valve 28, and line 57) and receptacle 519 (e.g., via line 58, junction 39, and line 85).

In such a system configuration as that illustrated in FIG. 6, the system may be operated to elute the additional target isotopes. For example, uranium (U) isotopes may be eluted from the UTEVA® Resin of the first column 100 by pumping an elution solution of nitric acid (HNO$_3$) (e.g., 0.01 M HNO$_3$) from source 118, with the eluate captured in receptacle 119. Molybdenum (Mo) isotopes may be eluted from the DIPHONIX® Resin of the third column 300 by pumping hydrochloric acid (HCl) (e.g., 9 M HCl) from source 318, with the eluate captured in receptacle 319. Strontium (Sr) isotopes may be eluted from the SR Resin of the fourth column 400 by pumping nitric acid (HNO$_3$) (e.g., 0.01 M HNO$_3$) from source 418, with the eluate captured in receptacle 419. Tellurium (Te) isotopes may be eluted from the TEVA® resin of the fifth column 500 by pumping nitric acid (HNO$_3$) (e.g., 1 M HNO$_3$) from source 518, with the eluate captured in receptacle 519. Notably, these second individual elutions through columns 100, 300, 400, and 500 may be carried out concurrently, which may further reduce the amount of time needed to process the sample 112 through the system.

In some embodiments, additional elution passes may be made, in parallel or in series, using one or more of the columns of the system and, optionally, using one or more additional sources and/or receptacles.

While, in some embodiments, a separate source may be utilized for each elution pass, in other embodiments, a single source may be shared between multiple columns where the elution solution to be used in the multiple columns is the same. For example, sources 118, 216, and 418 may not be separate sources for 0.01 M HNO$_3$ but a single source from which select volumes of the 0.01 M HNO$_3$ may be released and fed into the individual columns to be eluted with nitric acid of that concentration.

In other embodiments additional chromatographic columns may be included in the system for separation of additional isotopes from the fission products sample. For example, a column targeting technetium (Tc) isotopes (e.g., Tc-99/99m) may be included, and a column targeting iodine (I) isotopes (e.g., I-131/132/133) may be included. It is contemplated that such columns may be included in the system before the aforementioned first column 100 because the separation of the Tc isotopes and I isotopes at the start of the system may prevent these isotopes from partitioning into many different fractions if included in the system in later columns.

Following processing of the sample 112 through the system, the sources and receptacles may be removed and replaced (as needed), the valves 20-28 returned for the series configuration for at least columns 100, 200, 300, and 400 and the preconditioning solution 110 pumped through these columns, as in the stage of FIG. 1, to precondition them for another sample run. Concurrently, the fifth column may be reconnected to the other preconditioning solution 510, which may be pumped through the fifth column 500, as in the stage of FIG. 1, to precondition it for another sample run.

Thus, the system may be used to fully process the sample 112 without dry-down stages and without an operator having to physically transport, during the processing, the sample 112 or other system equipment that may contain radioactive material. In some embodiments, reconfigurations of the system (e.g., from series configurations to parallel configurations and back) may be accomplished simply by adjusting valves. In other embodiments, the number of valves may be minimized by moving lines between various sources and between various receptacles, but still without having to move or remove from the system the sample 112 or the columns.

Example

Using a system like that illustrated in FIGS. 1 through 7, a sample of uranium fission products was processed. In the following discussion of the processing of the sample, system components discussed above with regard to the figures will be noted by reference number as used in FIGS. 1 through 7.

To create a uranium-fission product containing samples, 0.1 g to 0.8 g of natural uranium metal foils were irradiated using a 44 MeV electron linear accelerator at the Idaho State University Idaho Accelerator Center. The foils were irradiated with bremsstrahlung photons at a 26 MeV endpoint energy, producing approximately 5.6 (0.68)×10$^{12}$ to 2.0× 10$^{13}$ total fissions per sample. Total fissions were determined by gamma spectroscopy utilizing U-237 decay peaks and by comparison of the U-238($\gamma$,n) and U-238($\gamma$,f) production cross sections. (Cross section values were obtained from ENDF/B-VII.1 to listed end point values and continued to 26 MeV with TENDL-2015). After irradiation, samples were allowed to cool for one to two days, following which samples were counted at a 70 cm distance from a high purity germanium detector to determine U-237 production. Once counting was completed, samples were packaged and shipped to Idaho National Laboratory (INL) for subsequent dissolution, chemical separations and analyses.

Upon receipt at INL, the sample was placed in a 60 mL round-interior Savillex PFA vial (e.g., container 10). A 2-port lid (i.e., a lid with two openings (e.g., openings 12, 14)) was attached to the vial (container 10) and the vial (container 10) was placed in a heat block (e.g., hotplate 16) with the digital hotplate temperature set to 170° C. and with the actual temperature at the dissolver (the container 10) being less than 100° C. 1 mL of concentrated $HNO_3$ was added to the vessel (container 10) via pipet through the ported lid (opening 12) and the sample was allowed to react to completion. Upon dissolution, the mass of the residual $HNO_3$ was determined, and sufficient $HNO_3$ and 18 MΩ $H_2O$ was added, gravimetrically, to bring the total concentration and volume (e.g., of the fission products sample 112) to 9 mL of 3 M $HNO_3$.

Prior to loading solution onto the system, all valve positions (e.g., of valves 20-28) on the system were placed in position to allow flow passage through each column (columns 100, 200, 300, and 400) in series. The UTEVA® (column 100), TRU (column 200), DIPHONIX® (column 300), and SR (column 400) columns were preconditioned with 10 mL of 3 M $HNO_3$ (preconditioning solution 110). The TEVA® column (column 500) was preconditioned with 10 mL 5 M HCl (other preconditioning solution 510). The system was allowed to continue pumping until the columns (columns 100, 200, 300, 400, and 500) were dry, following which the precondition collection vial (receptacle 411) was replaced with a Te+Fp collection vial (receptacle 413) (initially containing 21 mL concentrated HCl).

Upon completion of preconditioning, a 1/16" tubing line (line 60) was placed inside the dissolver vial (via opening 14) and the dissolver solution (sample 112) was pumped (FIG. 2) via peristaltic pump (pump 18) through the UTEVA®-TRU-DIPHONIX®-Sr Resin tandem column setup (columns 100, 200, 300, and 400 in series) at a flow rate of about 2 mL/min. After completely passing solution (sample 112) through the columns (columns 100, 200, 300, and 400), the peristaltic pump (pump 18) was turned off.

1 mL of 3 M $HNO_3$ was added to the dissolver vial (container 10) through the ported lid (via opening 12) (see FIG. 3), and the vial (container 10) was gently swirled to maximize rinsing. The rinse solution was pumped through the column sequence (columns 100, 200, 300, and 400). Following rinsing, the peristaltic pump (pump 18) was turned off, and valve line A (e.g., lines 60 and 42, in combination) was changed (e.g., to lines 62, 41, and 42, in combination) from position A (e.g., from opening 14 of the container) to position B (from the source 114) (to intake solution from the UTEVA® Rinse #1 vial (source 114) rather than the dissolver (container 10)). The 1/16" tubing line (line 60) connecting Valve A (valve 20) to the dissolver vial (container 10) was disconnected (FIG. 4) and the dissolver vial (container 10) and tubing (line 60) were carefully placed in a sealable bag for waste disposal. The peristaltic pump (pump 18) was then turned back on, and the columns (columns 100, 200, 300, and 400) were rinsed with an additional 19 mL of 3 M $HNO_3$ (additional solvent from the container for source 114), with the load and rinse fractions collected in the Te+FP vial (receptacle 413) at the end of the UTEVA®-TRU-DIPHONIX®-SR Resin line (columns 100, 200, 300, and 400) (but before the final TEVA® column (column 500)).

Figure 7:
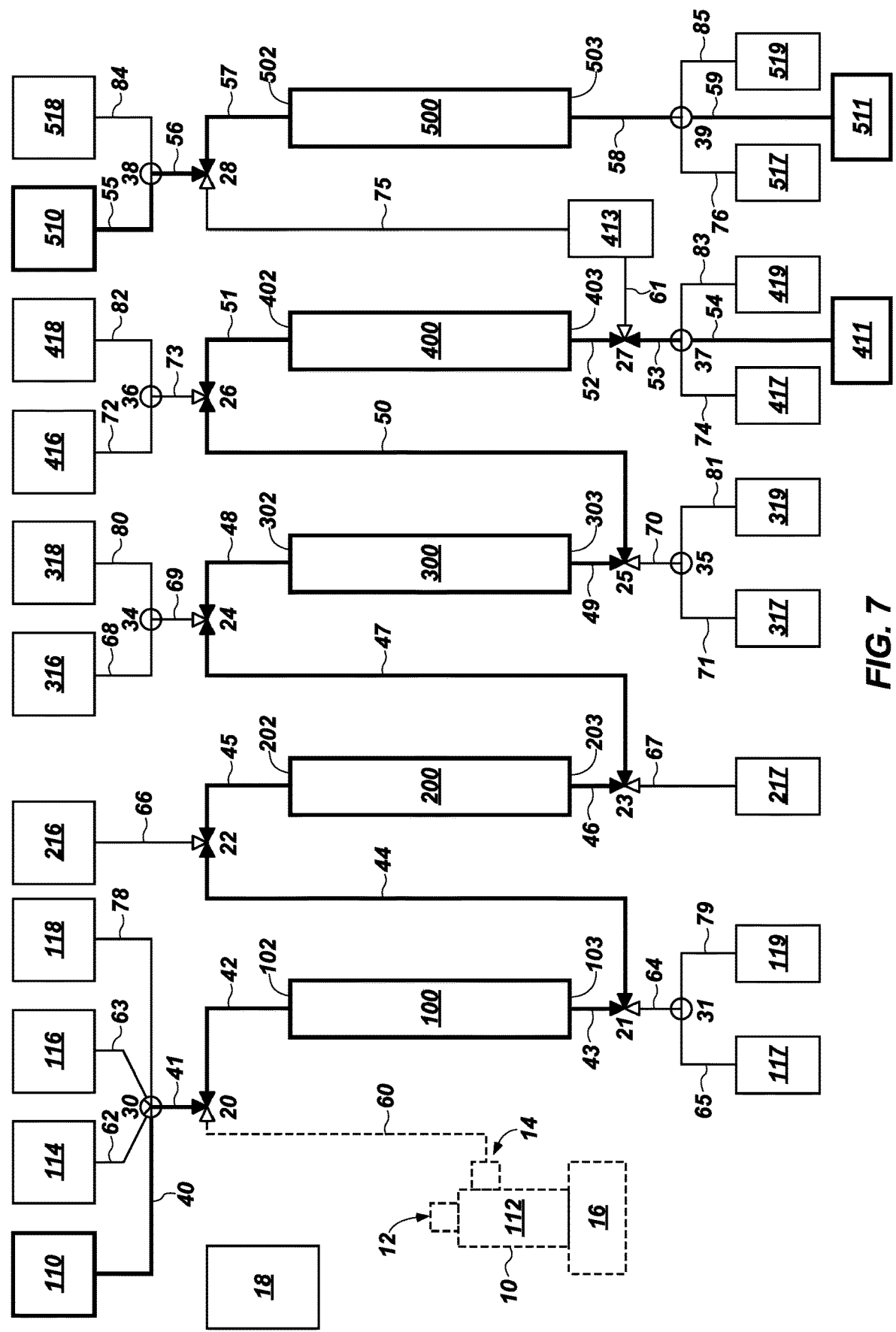

Upon rinsing, the peristaltic pump (pump 18) was turned off, and all valve positions (valves 20-28) were adjusted to change the direction of solution flow through the UTEVA®-TRU-DIPHONIX®-SR Resin lines (columns 100, 200, 300, and 400) from series flow to parallel flows (FIG. 7). Additionally, the Te+FP vial (receptacle 413) was lightly mixed via pipet (to ensure complete mixing between the 3 M $HNO_3$ elution solution and the 21 mL of concentrated HCl previously placed in this vial (receptacle 413)). Intake lines for UTEVA®, TRU, DIPHONIX®, SR, and TEVA® Resins (e.g., lines 42, 45, 48, 51, and 57, respectively) were then attached to the peristaltic pump (pump 18). The pump (pump 18) was then turned back on and the simultaneous elution of Zr from UTEVA® (in column 100) was performed with 30 mL 3 M $HNO_3$+0.05 M HF (from source 116); In/Sb/Sn from DIPHONIX® (in column 300) using 10 mL 3 M HCl (from source 316); the lanthanides from TRU (in column 200) using 30 mL 0.01 M $HNO_3$ (from source 216); Ba from the SR Resin (in column 400) using 30 mL of 8 M $HNO_3$ (from source 416); and the fission products were eluted through TEVA® (in column 500) from the Te and FP mixture vial (receptacle 413) using the 29 mL 3 M $HNO_3$ fission product mixture and the 21 mL concentrated HCl followed by 30 mL 5 M HCl rinsing.

Following elution, the pump (pump 18) was turned off, and intake lines (e.g., lines 63/41/42, 66/45, 68/69/48, 72/73/51, and 75/57, respectively) and output lines (e.g., lines 43/64/65, 46/67, 49/70/71, 52/53/74, and 58/76, respectively) were transferred to appropriate elution solution/collection vials (e.g., to sources 118, 318, 418, and 518 and receptacles 119, 319, 419, and 519, as illustrated in FIG. 6). The peristaltic pump (pump 18) was then turned back on, and U was eluted from UTEVA® (in column 100) using 30 mL 0.01 M $HNO_3$ (from source 118); Mo from DIPHONIX® (in column 300) via 30 mL 9 M HCl (from source 318); Sr from SR Resin (in column 400) using 30 mL 0.01 M $HNO_3$ (from source 418); and Te from TEVA® (in column 500) using 30 mL 1 M $HNO_3$ (from source 518). Sample collection vials (e.g., receptacles 117, 119, 217, 317, 319, 417, 419, 517, 519) were then capped, and all valves (valves 20-28) changed back to their position for the series configuration of the system, placing solution flow through the columns in sequence (FIG. 7). The columns of the system were reconditioned with 3 M $HNO_3$ through the UTEVA®-TRU-DIPHONIX®-SR Resin columns (columns 100, 200, 300, and 400) and with 5 M HCl through the TEVA® column (column 500) (FIG. 7) in preparation for the next sample separation.

Analyses were performed using a Thermo iCAP-Q Quadrupole inductively coupled plasma-mass spectrometer (ICP-MS). Concentrations were determined via external calibration, with calibration curves derived from dilutions of NIST traceable ICP-MS standard solutions.

Analyses of fission product concentrations from uranium fission samples were performed using a High Purity Germanium gamma spectrometer. Chemical yields were determined by comparison of the total activity of a specific gamma energy line in the dissolver solution (sample 112) compared with activities for the same energy line in individual separated fractions. Assessment of the chemical purity of each fraction was performed by careful identification of individual gamma energy line identities through comparison to Peak-Easy gamma spectral libraries, comparison of activities at given gamma energies to literature reported branching ratios, and by careful evaluation of gamma spectral peak shapes, etc.

Further determination of trace impurities in each fraction from uranium-fission samples was further evaluated via Inductively Coupled Plasma-Mass Spectrometry (ICP-MS) using an Elan DRC-II Quadrupole ICP-MS. 100 µL aliquots of each purified solution were obtained, diluted to 10 mL using Optima Grade 2% $HNO_3$, and submitted to the INL Analytical Laboratory for ICP-MS analysis. Concentrations were determined via external calibration using dilutions from NIST traceable ICP-MS standard solutions.

Figure 8:
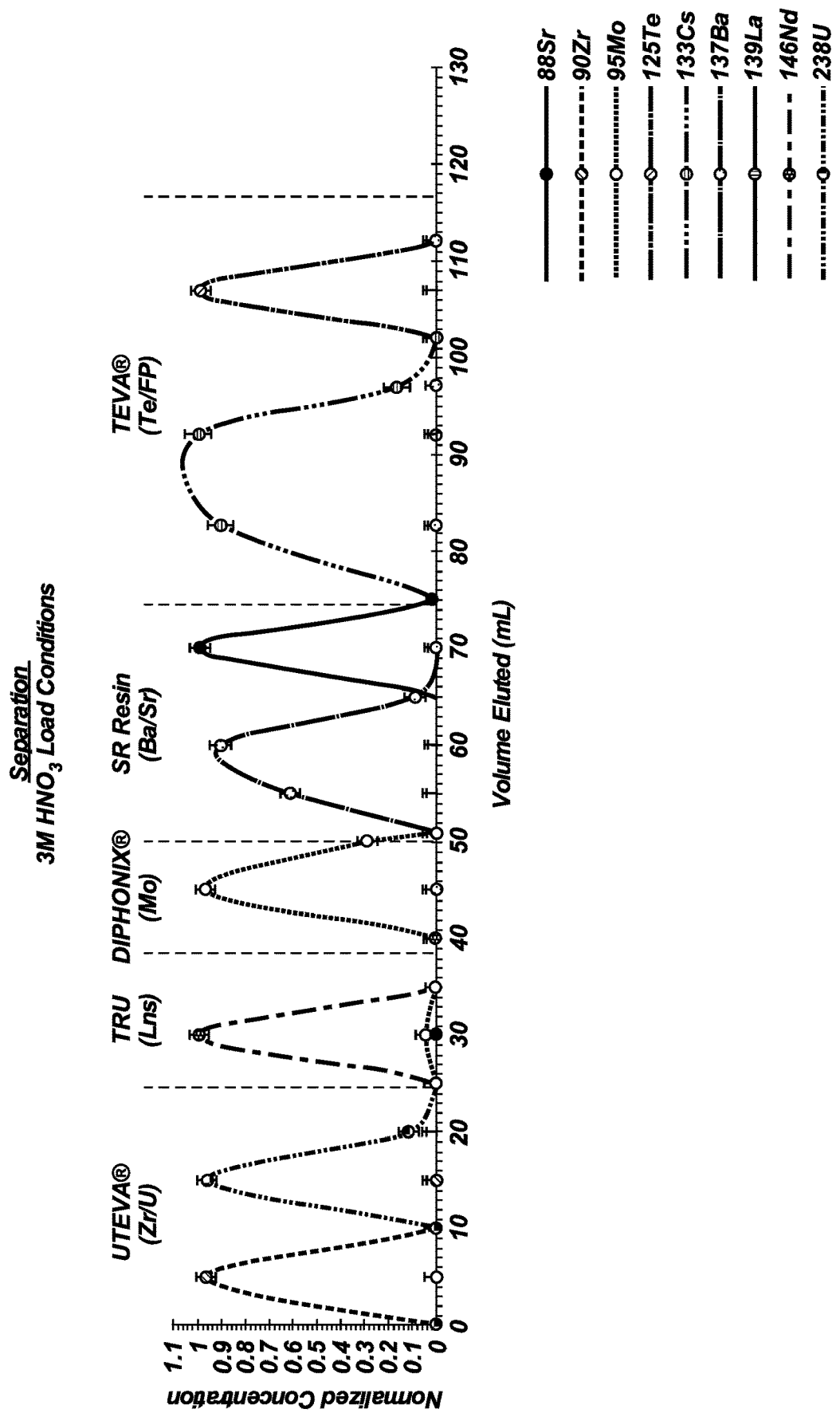
FIG. 8 is a graph showing elution profiles achieved using the system and method of FIGS. 1 through 7.

Elution profiles are shown in FIG. 8. As the results indicate, the method enabled baseline separation of each of the target elements from each other, with a separation timeline on the order of 2.5 hours. More particularly, dissolution of the uranium metal samples in nitric acid and chemical isolation of U, Zr, Mo, Te, Ba, Sr, and the lanthanides was achieved in under 3 hours. It was also observed that yields of greater than 90% were obtained for U, Zr, Ba, Sr, Te, and the lanthanide isotopes. Yields for Mo were observed to be about 70%. More particularly, observed chemical yields are shown in the following Table 1.

TABLE 1

| Purified Element Fraction | Target Isotopes Detected (gamma spectrometry) | Percent Chemical Yield | Co-eluting Impurities Detected* |
|---|---|---|---|
| Uranium | $^{237}$U (U-237) | >99% | None |
| Zirconium | $^{95,97}$Zr (Zr-95, Zr-97) | 94.6 ± 7% | $^{99m}$Tc (Tc-99m), $^{103}$Ru (Ru = 103), $^{239}$Np (Np-239), $^{237}$U (U-237) |
| Lanthanides | Various | 102 ± 3% | $^{99m}$Tc (Tc-99m) |
| Molybdenum | $^{99}$Mo (Mo-99) | 71 ± 1% | $^{115m}$In (In-115m), $^{125}$Sn (Sn-125), $^{127}$Sb (Sb-127) |
| Tellurium | $^{131,132}$Te (Te-131, Te-132) | 92.3 ± 3% | $^{115}$Cd (Cd-115) |
| Barium | $^{140}$Ba (Ba-140) | 95 ± 1% | $^{132}$Te (Te-132) |
| Strontium | $^{87}$Sr (Sr-87) | >95% | None |

Residual Fission Products
*Trace $^{131/132/133}$I (I-131, I-132, I-133) detected in all fractions Accordingly, the methods and system provide a significant improvement over previous gravimetric column-based separations that required up to one week to complete separations. It also enables a greater sample throughput. For example, the system can be used to process multiples samples (e.g., two or more, e.g., six or more samples) in one day, as compared to prior systems and methods that may allow processing of one to three samples per week.

While the disclosed systems and methods are susceptible to various modifications and alternative forms in implementation thereof, specific embodiments have been shown by way of example in the drawings and have been described in detail herein. However, it should be understood that the present invention is not limited to the particular forms disclosed. Rather, the present invention encompasses all modifications, combinations, equivalents, variations, and alternatives falling within the scope of the present disclosure as defined by the following appended claims and their legal equivalents.

What is claimed is:

1. A system for separating isotopes from a sample of fission products, the system comprising:
   a plurality of chromatography columns, each containing a chromatographic resin differing in isotope selectivity from other chromatographic resins of the system; and
   a plurality of valves in operative connection to lines communicating between at least some of the chromatography columns, the valves being adjustable to transition the system between a series configuration, wherein a fluid passage is defined through at least some of the chromatography columns in series, and a parallel configuration, wherein a plurality of fluid passages is defined through the chromatography columns in parallel, without physically repositioning the chromatography columns; and
   at least one acid source in selective communication into at least one of the chromatography columns, the at least one acid source comprising:
      at least one source of nitric acid in selective communication into at least one of the chromatography columns when the valves are adjusted to the parallel configuration; and
      at least one source of hydrochloric acid in selective communication into at least one other of the chromatography columns when the valves are adjusted to the parallel configuration.

2. The system of claim 1, further comprising a peristaltic pump in operative communication with the lines.

3. The system of claim 1, further comprising a container at a leading end of the lines, the container comprising a plurality of openings.

4. The system of claim 3, further comprising a heat source adjacent the container.

5. The system of claim 1, wherein the plurality of chromatography columns comprises at least five chromatography columns.

6. The system of claim 1, wherein:
   the at least one acid source comprises a plurality of acid sources,
   the valves, of the plurality of valves, are further adjustable to transition the system between the parallel configuration and an additional parallel configuration,
   in the parallel configuration, at least some of the lines connect a respective inlet of a respective one of the chromatography columns to an acid source of the plurality of acid sources, and
   in the additional parallel configuration, at least others of the lines connect the respective inlet of the respective one of at least some of the chromatography columns to at least one additional acid source of the plurality of acid sources.

7. The system of claim 1, further comprising a receptacle at an outlet of the fluid passage of the series configuration, the receptacle comprising an acid to mix with fluid exiting the outlet of the fluid passage of the series configuration.

8. The system of claim 7, wherein the fluid passage of the series configuration is defined through all but a last one of the chromatography columns of the system.

9. The system of claim 8, wherein the lines comprise:
at least one line communicating:
from a final chromatography column of the chromatography columns in the series, and
to the receptacle; and
at least one additional line communicating:
from the receptacle, and
to the last one of the chromatography columns of the system.

10. A system for separating isotopes from a sample of fission products, the system comprising:
a container for a sample of fission products;
a plurality of chromatography columns comprising chromatographic resins of differing isotope selectivity, the container being operatively connectable into a chromatography column of the plurality of chromatography columns;
a plurality of acid sources, each operatively connectable, via at least one valve of a plurality of valves, into at least one of the chromatography columns of the plurality of chromatography columns;
a plurality of receptacles, each operatively connectable, via at least one other valve of the plurality of valves, out from at least one of the chromatography columns of the plurality of chromatography columns; and
the plurality of valves being adjustable to transition the system, without physically repositioning the chromatography columns, between:
a series configuration, wherein a continuous fluid passage is defined through a series of at least some of the chromatography columns to a receptacle of the plurality of receptacles; and
a parallel configuration, wherein a distinct fluid passage is defined, for each respective chromatography column of the chromatography columns:
from at least one of the acid sources, of the plurality of acid sources, through the respective chromatography column, and
to a respective additional receptacle, of the plurality of receptacles,
at least one additional valve, of the plurality of valves, adjustable to transition an inlet of the continuous fluid passage, of the series configuration, between the container and a preconditioning solution source comprising nitric acid.

11. The system of claim 10, wherein the plurality of valves is further adjustable to transition the system, without physically repositioning the chromatography columns, between:
the parallel configuration; and
an additional parallel configuration, wherein an additional distinct fluid passage is defined, for each respective chromatography column of at least some of the chromatography columns:
from at least one other of the acid sources, of the plurality of acid sources, through the respective chromatography column, and
to a respective other receptacle, of the plurality of receptacles.

12. The system of claim 10, further comprising a heat source adjacent the container.

13. A system for separating isotopes from a sample of fission products, the system comprising:
a plurality of chromatography columns reconfigurable, without physically repositioning the chromatography columns, between at least one series configuration and at least one parallel configuration, each chromatography column of the plurality of chromatographic columns containing a different chromatographic resin of a plurality of chromatographic resins comprising:
a first chromatographic resin conditionable for an isotope selectively specific to zirconium (Zr) isotopes and reconditionable for an isotope selectivity specific to uranium (U) isotopes;
a second chromatographic resin conditionable for an isotope selectivity specific to at least one lanthanide isotope;
a third chromatographic resin conditionable for an isotope selectivity specific to molybdenum (Mo) isotopes,
a fourth chromatographic rein conditionable for an isotope selectivity specific to barium (Ba) isotopes and reconditionable for an isotope selectivity specific to strontium (Sr) isotopes; and
a fifth chromatographic resin conditionable for an isotope selectivity specific to tellurium (Te) isotopes;
the at least one series configuration defining a continuous fluid passage through at least some of the chromatography columns of the plurality of chromatography columns, and
the at least one parallel configuration defining, through each respective chromatography column of the plurality of chromatography columns, an individual fluid passage.

14. The system of claim 13, wherein:
the first chromatographic resin is disposed in a first chromatography column, of the plurality of chromatography columns;
the second chromatographic resin is disposed in a second chromatography column, of the plurality of chromatography columns;
the third chromatographic resin is disposed in a third chromatography column, of the plurality of chromatography columns;
the fourth chromatographic resin is disposed in a fourth chromatography column, of the plurality of chromatography columns;
the fifth chromatographic resin is disposed in a fifth chromatography column, of the plurality of chromatography columns; and
the continuous fluid passage, of the at least one series configuration, extending through the first chromatographic column, then through the second chromatographic column, then through the third chromatographic column, and then through the fourth chromatographic column without continuing directly to the fifth chromatographic column.

15. The system of claim 13, further comprising a plurality of acid sources, comprising:
at least one nitric acid source in selectable communication with:
a chromatography column, of the plurality of chromatography columns, comprising the first chromatographic resin;
a chromatography column, of the plurality of chromatography columns, comprising the second chromatographic resin; and a chromatography column, of the plurality of chromatography columns, comprising the fourth chromatographic resin; and at least one hydrofluoric acid source in selectable communication with:
the chromatography column, of the plurality of chromatography columns, comprising the first chromatographic resin; and at least one hydrochloric acid source in selectable communication with:
a chromatography column, of the plurality of chromatography columns, comprising the third chromatographic resin; and
a chromatography column, of the plurality of chromatography columns, comprising the fifth chromatographic resin.

* * * * *

UNITED STATES PATENT AND TRADEMARK OFFICE
CERTIFICATE OF CORRECTION

PATENT NO. : 11,839,852 B2
APPLICATION NO. : 17/154658
DATED : December 12, 2023
INVENTOR(S) : Mathew S. Snow and Jessica L. Ward It is certified that error appears in the above-identified patent and that said Letters Patent is hereby corrected as shown below:

In the Specification
Column 7, Line 58, change "acid Nis at" to --acid $N$ is at--

In the Claims
Claim 10, Column 15, Lines 46-47, change "the plurality of receptacles, at least" to --the plurality of receptacles; at least--

Claim 13, Column 16, Lines 10-11, change "an isotope selectively specific" to --an isotope selectivity specific--

Claim 13, Column 16, Lines 20-21, change "isotopes, a fourth" to --isotopes; a fourth--

Claim 13, Column 16, Line 21, change "chromatographic rein conditionable" to --chromatographic resin conditionable--

Signed and Sealed this
Nineteenth Day of March, 2024

Katherine Kelly Vidal
*Director of the United States Patent and Trademark Office*